US 8,538,590 B2

(12) United States Patent
Sun et al.

(10) Patent No.: US 8,538,590 B2
(45) Date of Patent: Sep. 17, 2013

(54) ACTIVE VIBRATION SUPPRESSION VIA POWER MINIMIZATION

(75) Inventors: Fanping Sun, Glastonbury, CT (US); Zaffir A. Chaudhry, South Glastonbury, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 330 days.

(21) Appl. No.: 12/748,426

(22) Filed: Mar. 28, 2010

(65) Prior Publication Data

US 2010/0262300 A1  Oct. 14, 2010

Related U.S. Application Data

(60) Provisional application No. 61/168,646, filed on Apr. 13, 2009.

(51) Int. Cl.
*G05B 21/00* (2006.01)

(52) U.S. Cl.
USPC .......................................... 700/280; 700/297

(58) Field of Classification Search
USPC .................. 700/275, 280, 286, 297
See application file for complete search history.

(56) References Cited

U.S. PATENT DOCUMENTS

| 2,488,290 A * | 11/1949 | Hansell .......................... 310/317 |
|---|---|---|
| 5,219,143 A | 6/1993 | Staple et al. |
| 5,251,863 A | 10/1993 | Gossman et al. |
| 5,269,489 A | 12/1993 | West et al. |
| 5,754,662 A | 5/1998 | Jolly et al. |
| 5,793,598 A * | 8/1998 | Watanabe et al. ............. 361/144 |
| 5,838,092 A * | 11/1998 | Wang et al. .................... 310/326 |
| 5,845,236 A | 12/1998 | Jolly et al. |
| 5,853,144 A | 12/1998 | Vincent |
| 6,002,778 A | 12/1999 | Rossetti et al. |
| 6,105,900 A | 8/2000 | Welsh et al. |
| 6,189,836 B1 | 2/2001 | Gold et al. |
| 6,229,898 B1 | 5/2001 | Goodman |
| 6,402,089 B1 | 6/2002 | Kiss et al. |
| 6,416,016 B1 | 7/2002 | Welsh |
| 6,460,803 B1 | 10/2002 | Kiss et al. |
| 6,467,723 B1 | 10/2002 | Rossetti et al. |
| 6,478,110 B1 | 11/2002 | Eatwell et al. |
| 6,480,609 B1 | 11/2002 | Strehlow et al. |

(Continued)

FOREIGN PATENT DOCUMENTS

| DE | 10001159 A1 | 7/2001 |
|---|---|---|
| EP | 1301395 | 4/2003 |
| WO | 9746813 A2 | 12/1997 |
| WO | 2005079200 | 8/2005 |

OTHER PUBLICATIONS

Bailey et al., "RCS/Piezoelectric Distributed Actuator Study", AFAL-TR-88-038, Air Force Astronautics Laboratory, Aug. 1988.*

(Continued)

*Primary Examiner* — Carlos Ortiz Rodriguez
(74) *Attorney, Agent, or Firm* — Carlson, Gaskey & Olds P.C.

(57) ABSTRACT

A vibration suppressor system includes a control system operable to control power from a power system to an actuator system in response to a minimal actuation power algorithm. The minimal actuation power algorithm employs a real electric power consumption of the actuator system as a single control objective function to suppress a vibration of the structure.

16 Claims, 3 Drawing Sheets

(56) References Cited

U.S. PATENT DOCUMENTS

| | | |
|---|---|---|
| 6,644,590 B2 | 11/2003 | Terpay et al. |
| 6,695,106 B2 | 2/2004 | Smith et al. |
| 6,792,798 B2 * | 9/2004 | Liang .................... 73/152.58 |
| 6,869,375 B2 | 3/2005 | Welsh |
| 7,017,857 B2 | 3/2006 | Hill et al. |
| 7,114,711 B2 | 10/2006 | Allaei |
| 7,118,328 B2 | 10/2006 | Welsh et al. |
| 7,216,018 B2 | 5/2007 | Zuo et al. |
| 7,224,807 B2 | 5/2007 | Welsh et al. |
| 2010/0102771 A1 * | 4/2010 | Anderson .................... 318/809 |

OTHER PUBLICATIONS

European Search Report for European Patent Application No. 10157683.3 completed May 23, 2013.

* cited by examiner

ACTIVE VIBRATION SUPPRESSION VIA POWER MINIMIZATION

REFERENCE TO RELATED APPLICATIONS

The present disclosure claims the benefit of U.S. Provisional Patent Application No. 61/168,646, filed Apr. 13, 2009.

BACKGROUND

The present disclosure relates to a vibration suppressor system, and more particularly to an actuation current and phase sensing actuator system which utilizes real electric power consumption of the actuator system as a single control objective function to suppress a vibration of a structure.

A passive vibration control system reduces system vibration through consumption of a portion of the power intake from the vibratory source so as to reduce the vibratory source energy which operates to sustain vibration in the system. In contrast, an active vibration control system rejects power intake from all the vibratory sources. A control vibration is introduced into the mechanical structure such that the mechanical impedance of the system to the vibration sources changes and the system reduces or rejects the net total energy intake from all the sources.

Conventional active vibration isolation or suppression of a mechanical component typically involves a sensor array which monitors the vibratory response, a controller with complex input/output algorithms to provide feedback from the sensory array to excite an actuator system which operates on the mechanical component (FIG. 1). In many cases, the implementation of active control is relatively complicated.

SUMMARY

A vibration suppressor system according to an exemplary aspect of the present disclosure includes a control system operable to control power from a power system to an actuator system in response to a minimal actuation power algorithm. The minimal actuation power algorithm employs a real electric power consumption of the actuator system as a single control objective function to suppress a vibration of the structure.

A method of vibration suppression according to an exemplary aspect of the present disclosure includes controlling power to an actuator system for applying a force to a structure by employing a real electric power consumption of the actuator system as a single control objective function to suppress a vibration of the structure.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
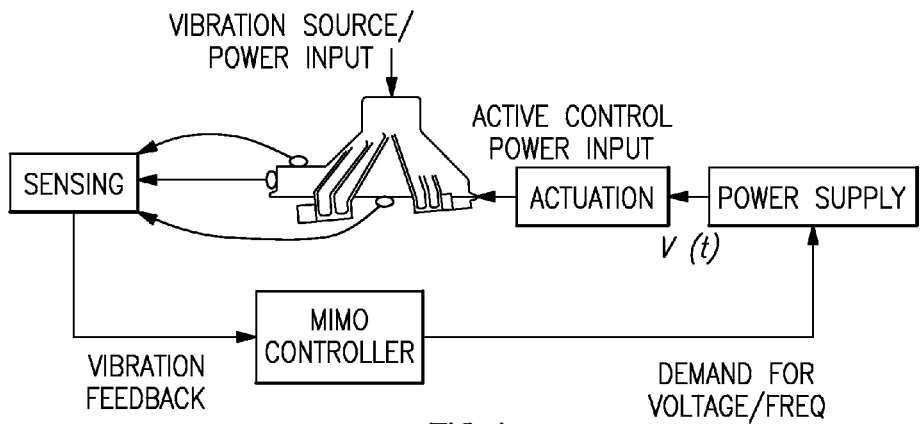
FIG. 1 is a schematic view of a RELATED ART vibration suppressor system.
Figure 2:
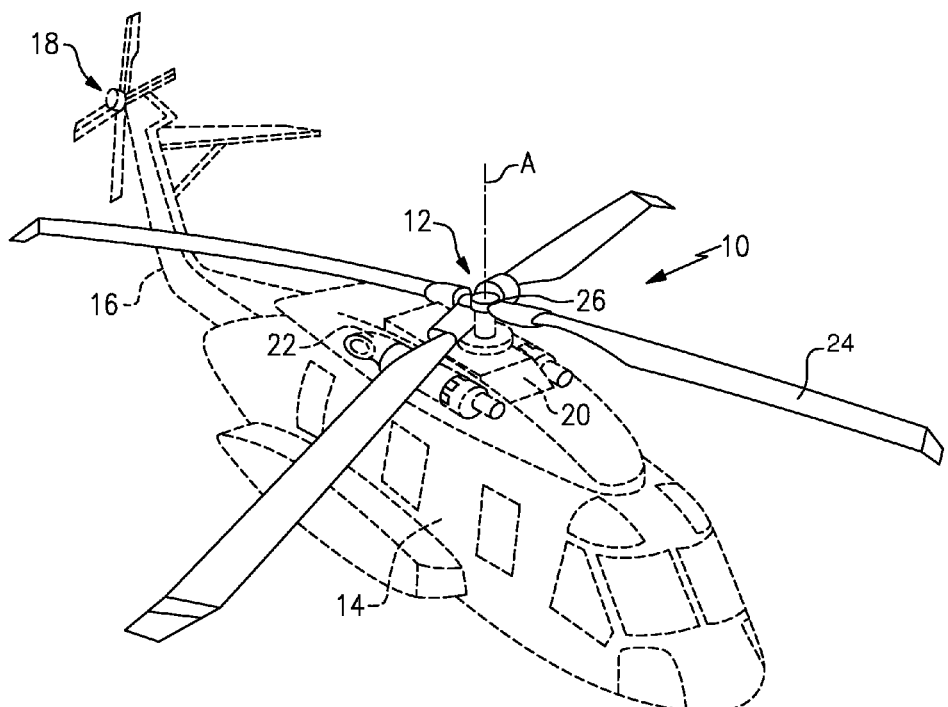
FIG. 2 is a general perspective view of an exemplary rotary wing aircraft embodiment for use with the present disclosure.

FIG. 2 schematically illustrates a rotary-wing aircraft 10 having a main rotor system 12. The aircraft 10 includes an airframe 14 having an extending tail 16 which mounts an anti-torque system 18. The main rotor assembly 12 is driven about an axis of rotation A through a main rotor gearbox (MGB) 20 by a multi-engine powerplant system 22—here having the engine packages ENG1, ENG2. The multi-engine powerplant system 22 is integrated with the MGB 20 which drives the main rotor assembly 12 and the anti-torque system 18. The multi-engine powerplant system 22 generates the power available for flight operations and couples such power to the main rotor assembly 12 through the MGB. The main rotor system 12 includes a multiple of rotor blades 24 mounted to a rotor hub 26. Although a particular helicopter configuration is illustrated and described in the disclosed embodiment, other configurations and/or machines, such as high speed compound rotary-wing aircraft with supplemental translational thrust systems, dual contra-rotating, coaxial rotor system aircraft, turbo-props, tilt-rotors tilt-wing aircraft and non-aircraft applications such as wind turbines will also benefit herefrom.

Figure 3:
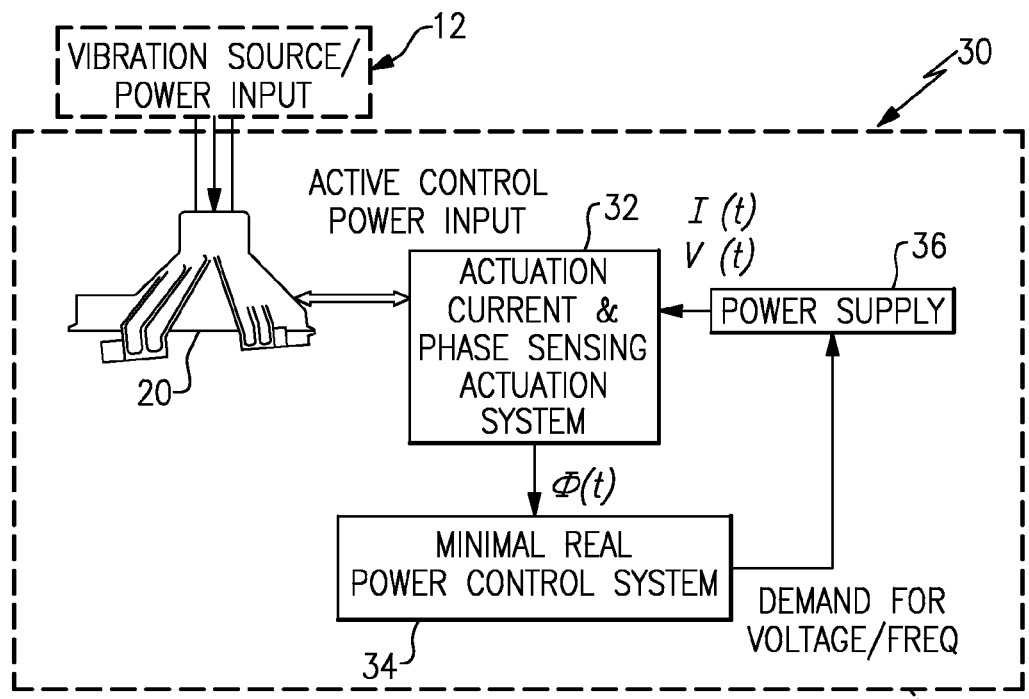
FIG. 3 is a schematic view of a vibration suppressor system according to one non-limiting embodiment of the present disclosure.

Referring to FIG. 3, a vibration suppressor system 30 is mounted within the aircraft 10 to reduce the vibratory forces on a mechanical structure such as the MGB 20, a structural panel on the aircraft fuselage interior, the fuselage exterior, or other structure. It should be understood that various mechanical structures may benefit herefrom. Vibratory forces from a vibratory source such as the main rotor system 12 are generated by a variety of factors, although the dominant vibrations originate from aerodynamic and/or gyroscopic forces generated by each rotor blade 24. The vibratory forces are transferred to the MGB 20 and thereon to the airframe 14.

The vibration suppressor system 30 generally includes an actuation current and phase sensing actuator system 32, a minimal real power control system 34 and a power supply 36. The control system 34 controls the excitation of the actuator system 32 to operate upon the structure to which vibration is to be minimized. Notably, no distributed sensor array need be applied to the structure (the MGB 20 in the illustrated example of FIG. 3) for monitoring the vibratory response. The control system 34 in one non-limiting embodiment may be a single objective function Single Input Single Output (SISO) control. Active vibration suppression through a minimal actuation power algorithm minimizes the control hardware requirements and greatly simplifies the control algorithm through a unified objective control function.

For a damped mechanical structure such as the MGB 20 to sustain vibration, the damped mechanical structure must continuously receive energy from the vibratory sources. At a steady state, the energy intake of the mechanical structure in each vibratory cycle equates to the level of vibration energy consumed by the damping. The vibration amplitude is proportional to the power intake from the vibratory sources such that lower instantaneous power intake into the mechanical structure results in reduced vibration amplitude.

Power, whether mechanical or electric, is a complex quantity that has both real and imaginary parts. However, only the real part delivers net energy to the mechanical structure in each vibration cycle which sustains the vibration. The actuator system 32 serves as a control disturbance that delivers an imaginary power to the mechanical structure with zero or minimal real power. That is, the actuator system 32 supplies effort but not work. The total net energy into the mechanical structure is thereby minimized as is the steady state vibration thereof.

The actuator system 32, whether capacitive or inductive, has reactive characteristics and therefore inherently possesses a self-sensing vibration capability. The self-sensing capability of reactive actuators reduces the requirements for a distributed sensor array for vibratory response feedback. That is, the electric power the actuator system 32 receives from the power supply 36 is generally proportional to the mechanical power delivered to the mechanical structure. As such, the active vibration suppression disclosed in this non-limiting embodiment operates to minimize the real power into the actuator system 32.

The power the actuator system 32 receives from the power supply 36 is in complex format (e.g., having real and imaginary components). The composition of the real and imaginary power components depends on the mechanical impedance of the mechanical structure driven by the actuator system 32. For energy conservation, the real mechanical power delivered must equate to the real electric power (less actuator loss) in a complete vibration cycle. For a constant amplitude alternating voltage power supply 36, the electric power or current drawn from the power supply 36 by the actuator system 32 will thus directly map the resultant mechanical structure vibratory response. In other words, the actuator system 32 can excite the mechanical structure as well as sense the mechanical structure vibration through observation of the current drawn by actuator system 32 from the power supply 36.

Figure 5:
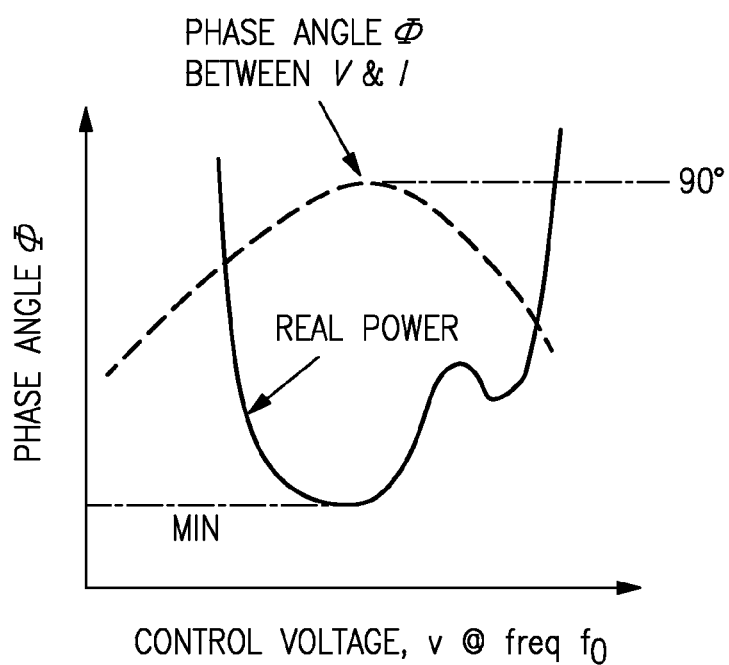
FIG. 5 is a graphical representation of effects of the minimal real power control algorithm of FIG. 4.

The minimization of real electric power into the actuator system 32 assures minimal real mechanical power into the vibrating mechanical structure and results in minimal vibration. As the real part of the electric power is proportional to the cosine of the phase angle between electric voltage and current, the minimal real power control scheme (FIG. 4) is readily implemented by sweeping the voltage into the actuator system 32 so as to force the phase angle of the electric current to +/−90° with respect to the voltage from the actuator power supply 36. The phase angle is able to approach +/−90° due to actuator electric and mechanical losses (FIG. 5). It should be noted that the little hump in the generic example of FIG. 5 indicates that the real power of the actuator system 32 may have more than one minima in general (local optimal and global minimal) such that the minimal actuation power algorithm seeks one that is achievable at a given condition then seeks the true minima as the given conditions change.

The minimization of real electric power into the actuator system 32 is forced by the minimization of the actuator real electric power. This may be mathematically expressed as follows:

$$v(t) = V_p \sin(\omega t), \; i(t) = I_p \sin(\omega t + \phi(\omega))$$

$$P_{real} = \int_0^{2\pi} V_p \sin(\omega t) I_p \sin(\omega t + \phi(\omega)) dt$$

$$= \frac{V_p I_p}{2} \cos(\phi(\omega))$$

Where:
v(t) is driving voltage;
i(t) is the actuator current;
ω is the driving voltage frequency;
φ is the phase angle of current with respect to voltage; and
$P_{real}$ is the real part of the electric power.

A capacitive actuator; such as piezoelectric actuator, may be controlled by the control system 34 with the minimal actuation power algorithm to actively control the minimal real mechanical power into the vibrating mechanical structure. The control objective of the capacitive actuator is the regulation of actuator voltage, V(t), to force current to lead voltage by a phase angle of nearly φ=+90°.

Figure 4:
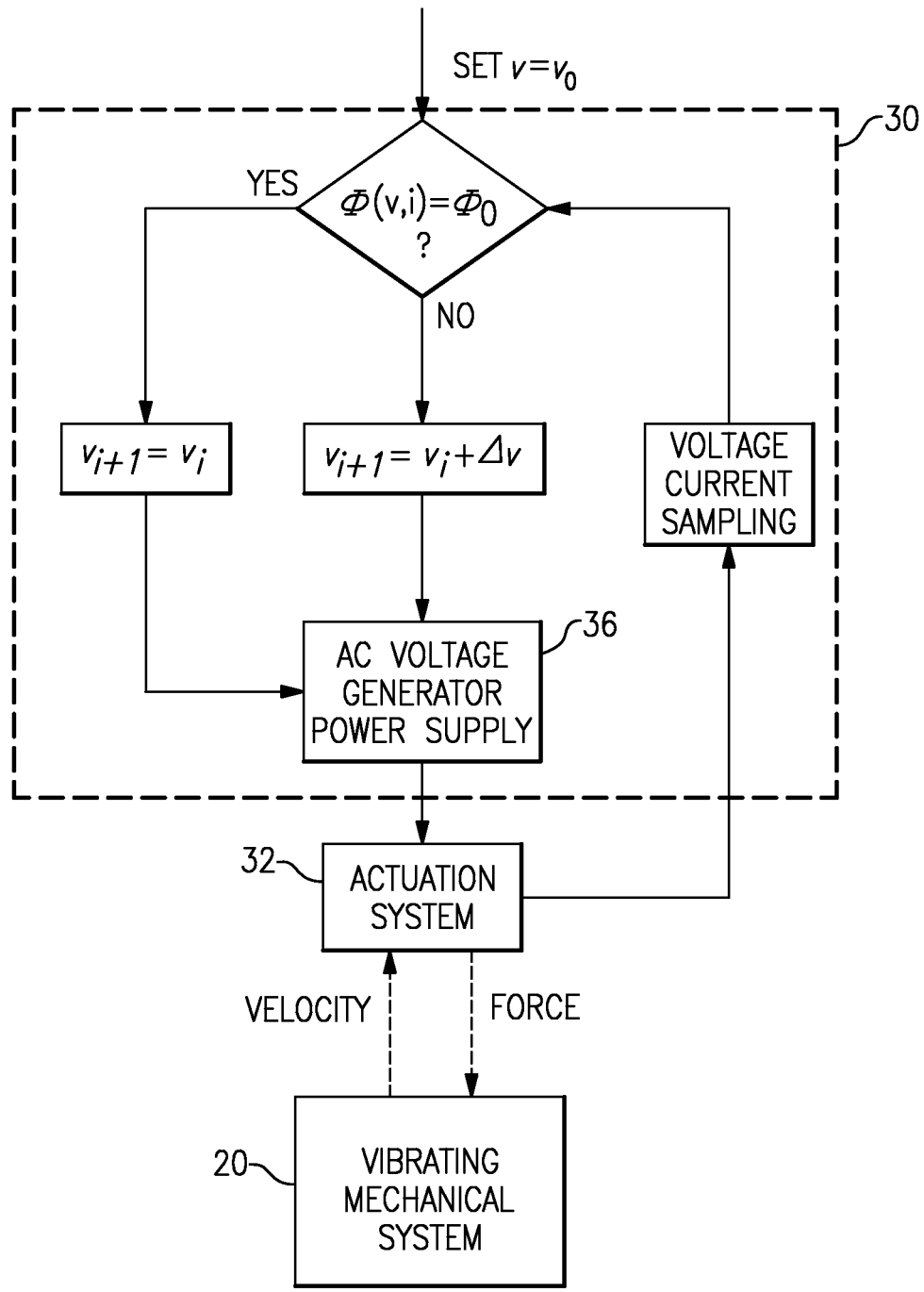
FIG. 4 is a graphical representation of a minimal real power control algorithm.

Alternatively, an inductive actuator, such as electromagnetic actuator, may be controlled by the control system 34 with the minimal actuation power algorithm (FIG. 4). The control objective of the electromagnetic actuator is the regulation of actuator current, I(t), to force current to lag voltage by a phase angle of nearly φ=−90°.

Referring to FIG. 4, the control system 34 employs the real electric power consumption of the actuator system 32 as a single control objective function for vibration suppression. Furthermore, the electric power monitoring of the actuator system 32 may be integrated into the power supply 36 to facilitate a relatively fast and more implementable control for real time vibration suppression. In this disclosed, non-limiting embodiment of the control algorithm, the electric current and the voltage in the actuator system 32 are constantly sampled. The phase angle is calculated and compared real time with a preset phase value. The control voltage is then updated based on the difference. The minimal actuation power algorithm iterates the control voltage until the objective function, which creates minimal real power, ($v_{i+1}=v_i$) is reached. The current phase change is the result of complex power equilibrium/interaction in the vibrating system. Any change to the control actuator voltage amplitude leads to changes in the real and imaginary power inputs to the system from the control actuator as well as from the vibration source. When sweeping the control voltage amplitude from zero to an optimal, the real power changes from a negative value (damping mode) to zero (complete cancellation mode). Correspondingly, the current phase lead to voltage changes from 180 deg to 90 deg for a capacitive actuator, and current phase lag to voltage changes from 180 to −90 deg for an inductive actuator. Further increase of voltage amplitude changes the real power to a positive value and drives the system into vibration augmentation mode.

The functions of the minimal actuation power algorithm are disclosed in terms of functional block diagrams, and it should be understood by those skilled in the art with the benefit of this disclosure that these functions may be enacted in either dedicated hardware circuitry or programmed software routines capable of execution in a microprocessor based electronics control embodiment such as a module. In one non-limiting embodiment, the module may be a portion of a flight control computer, a portion of a central vehicle control, an interactive vehicle dynamics module, a stand-alone line replaceable unit or other system.

The module typically includes a processor, a memory and an interface. The processor may, for example only, be any type of known microprocessor having desired performance characteristics. The memory may, for example only, includes UVPROM, EEPROM, FLASH, RAM, ROM, DVD, CD, a hard drive, or other computer readable medium which may store data and the control algorithms for operation of the minimal actuation power algorithm as described herein. The interface facilitates communication with the other avionics and systems.

It should also be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A vibration suppressor system comprising:
an actuator system for applying a force to a structure;
a power supply operable to power said actuator system; and
a control system operable to control power from said power supply to said actuator system using a power algorithm configured to suppress a vibration of said structure independently from a vibratory feedback of the structure and based on a function that has a single control objective and that receives real electric power of said actuator system as input,
wherein said power algorithm is configured to regulate an actuator voltage that is supplied to said actuator system from the power supply based on a phase angle difference between an actuator current and said actuator voltage,
wherein said single control objective comprises a regulation of said actuator current to lead or lag said actuator voltage by the phase angle difference,
wherein said power algorithm is further configured to cause said actuator current to lead or lag said actuator voltage by the phase angle difference.

2. The system as recited in claim 1, wherein said actuator system includes a capacitive actuator.

3. The system as recited in claim 1, wherein said single control objective function includes regulation of said actuator voltage to said actuator system which forces said actuator current to lead said actuator voltage by a phase angle, $\phi$, of nearly $\phi=+90°$.

4. The system as recited in claim 1, wherein said actuator system includes an inductive actuator.

5. The system as recited in claim 4, wherein said single control objective function includes regulation of said actuator voltage to said actuator system which forces said actuator current to lag said actuator voltage by a phase angle, $\phi$, of nearly $\phi=-90°$.

6. The system as recited in claim 1, wherein said control system minimizes the real electric power into said actuator system.

7. The system as recited in claim 6, wherein said real electric power of said actuator system is obtained from said power supply.

8. The system as recited in claim 1, wherein said structure includes a main gearbox of a rotary wing aircraft which interacts with said actuator system to suppress a vibration of said main gearbox.

9. A method of vibration suppression comprising:
controlling power to an actuator system for applying a force to a structure by using a power algorithm that suppresses a vibration of said structure independently from a vibratory feedback of the structure and suppresses the vibration based on function that has a single control objective and that receives real electric power of said actuator system as input,
wherein the power algorithm regulates an actuator voltage that is supplied to the actuator system from the power supply based on a phase angle difference between an actuator current and the actuator voltage,
wherein the single control objective comprises a regulation of the actuator current to lead or lag the actuator voltage by the phase angle difference,
wherein the power algorithm causes the actuator current to lead or lag the actuator voltage by the phase angle difference.

10. The method as recited in claim 9, further comprising:
minimizing the real electric power into the actuator system.

11. The method as recited in claim 9, further comprising:
regulation of said actuator voltage to the actuator system to force said actuator current to lead the actuator voltage by a phase angle of nearly $\phi=+90°$.

12. The method as recited in claim 9, further comprising:
regulation of said actuator voltage to the actuator system to force said actuator current to lag the actuator voltage by a phase angle of nearly $\phi=-90°$.

13. The method as recited in claim 9, further comprising:
sweeping a control voltage amplitude from zero to an optimal amplitude such that a real power changes from a negative value to zero as the single control objective function.

14. The method as recited in claim 13, further comprising:
identifying a current phase lead to voltage change from 180 degrees to 90 degrees for a capacitive actuator system.

15. The method as recited in claim 13, further comprising:
identifying a current phase lag to voltage change from 180 degrees to −90 degrees for an inductive actuator system.

16. The method as recited in claim 9, further comprising:
controlling a control actuator voltage amplitude to the actuator system to change a real and imaginary power input to the actuator system.

* * * * *